April 22, 1969    K. DAS GUPTA ET AL    3,440,419
DUAL PURPOSE OPTICAL INSTRUMENT CAPABLE OF SIMULTANEOUSLY
ACTING AS SPECTROMETER AND DIFFRACTOMETER
Filed Feb. 3, 1966

INVENTORS
KAMALAKSHA DAS GUPTA
HERBERT W. SCHNOPPER
ALBERT E. METZGER

ATTORNEYS

United States Patent Office 3,440,419
Patented Apr. 22, 1969

3,440,419
DUAL PURPOSE OPTICAL INSTRUMENT CAPABLE OF SIMULTANEOUSLY ACTING AS SPECTROMETER AND DIFFRACTOMETER
Kamalaksha Das Gupta, Pasadena, Calif., Herbert W. Schnopper, Ithaca, N.Y., and Albert E. Metzger, Sierra Madre, Calif., assignors to California Institute Research Foundation, Pasadena, Calif., a corporation of California
Filed Feb. 3, 1966, Ser. No. 524,746
Int. Cl. G01n *23/20*
U.S. Cl. 250—51.5        7 Claims

ABSTRACT OF THE DISCLOSURE

A dual purpose optical instrument capable of simultaneously acting as a spectrometer and diffractometer to respectively perform elemental and structural analysis of an unknown sample. The diffractometer portion of the instrument employs a modified form of Seeman-Bohlin focusing which involves providing a line source of X-rays, a sample, and a detector, all on the same focal circle. The spectrometer portion of the instrument employs a fixedly mounted X-ray energy detector mounted outside of the plane of the focal circle.

---

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates generally to an instrument suitable for simultaneously performing both an elemental and structural analysis of a crystalline sample.

Diffractometers and spectrometers are known in the prior art which respectively can be used to ascertain the structural and elemental nature of a sample. Thus, these instruments are used to facilitate the identification of unknown samples.

In general, diffractometers illuminate a crystalline sample with a suitable source of X-ray radiation. The sample scatters the radiation in a pattern which is characteristic of the space lattice of the crystal. If the radiation is comprised essentially of a monochromatic beam of wavelength $\lambda$, then the scattering angle $\theta$ of the radiation can be related to the lattice spacing $d$ by Bragg's Law $n\lambda = 2d \sin \theta$ where $n$ represents the reflection order.

In a spectrometer, a sample is also exposed to X-ray radiation. If the incident radiation has an energy above the K or L etc. ionization potential of the elements in the sample, then the sample will emit characteristic K or L etc. X-ray series lines which may be measured with a proportional counter.

In accordance with the present invention, a dual purpose instrument is provided capable of simultaneously performing both elemental and structural analysis of an unknown sample, which instrument characteristically is of light weight, has low power requirements, and has a relatively simple mechanical construction and operation. Thus, an instrument constructed in accordance with the present invention is particularly well suited for the remote analysis of lunar material, for example; however, the teachings of the present invention also have significant laboratory applications.

State of the art diffractometers can be classified into the following two categories depending upon the type of focusing employed:

(1) Bragg focusing is characterized by the distance from the sample to the source slit being equal to the distance from the sample to the detector slit.

(2) Seeman-Bohlin focusing is characterized by the source slit, the sample, and the detector slit all being on the circumference of the same focal circle.

Bragg focusing requires that the detector move in a circle described around the sample. Seeman-Bohlin focusing requires that the detector move in a circle with the sample on the circumference of the circle.

In accordance with a significant feature of the diffractometer portion of the preferred embodiment of the present invention, a modified form of Seeman-Bohlin focusing is employed which involves providing a line source of X-rays directly on the focal circle. This is distinguishable from prior art diffractometers in which the source slit was positioned on the focal circle. Arrangements constructed in accordance with this feature of the invention make more efficient utilization of the source power than prior art arrangements. Moreover, utilization of this type of focusing permits the sample holder to be retained in a fixed position thereby considerably reducing sample handling problems.

In accordance with a further feature of the present invention, several detectors can be moved along the focal circle together to thus reduce the scanning time required to obtain a full diffractometer scan pattern.

In accordance with a still further feature of the present invention, a single X-ray source can be positioned at a point of intersection of two focal circles, each encompassing a different sample. Thus, the single source can illuminate both samples simultaneously thus enabling both samples to be simultaneously analyzed.

The novel features that are considered characteristic of this invention are set forth with particularity in the appended claims. The invention itself will best be understood from the following description when read in connection with the accompanying drawings, in which:

Figure 1:
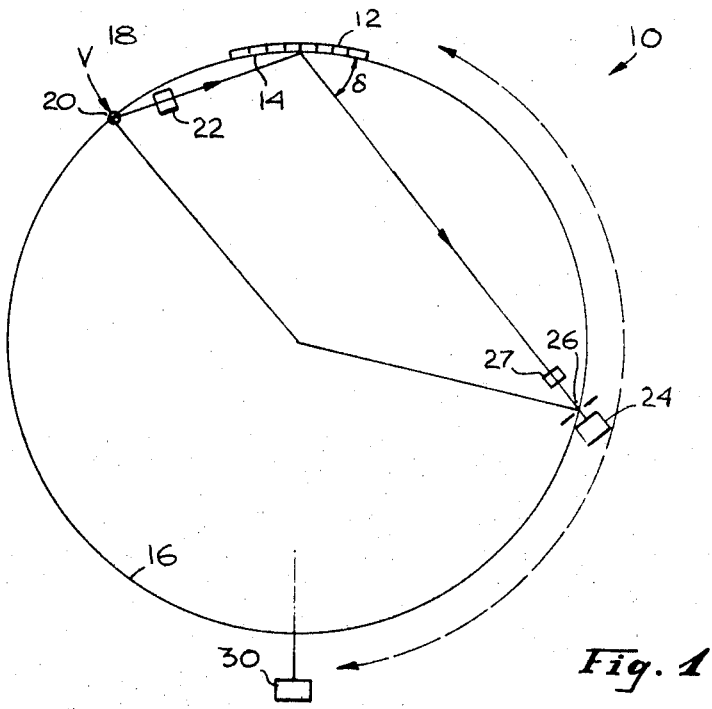
FIGURE 1 is a schematic diagram illustrating the principles of the present invention.

Attention is now called to FIGURE 1 of the drawings which schematically illustrates an instrument 10 constructed in accordance with the invention for simultaneously performing an elemental and structural analysis on an unknown crystalline sample disposed in the sample holder 12. The front face 14 of the sample holder, through which the sample is exposed, is arcuate and defines the circumference of a focal circle 16. It is preferable, but not necessary, that the sample within the sample holder 12 be in a powder-like form. A source of electron energy is provided which is comprised of a filament 18 focused on a target 20. The focal point on the target 20 is positioned on the focal circle 16. A soller slit apparatus 22 is preferably positioned adjacent the target 20 between the target and the sample holder 12 in order to primarily direct the X-ray radiation provided by the target at the sample.

A detector 24, having a receiving slit 26 placed in front thereof, is mounted for movement along the focal circle 16. More particularly, the receiving slit 26 is positioned on the circle 16. In use, the detector 24 is moved along the focal circle 16 with the receiving slit always directed at the center of the sample 12. The detector 24 can for example comprise a proportional or Geiger counter or similar type instrument commonly used in diffractometers. It should be understood however that the particular detector configuration is not critical to the present invention. A collimator 27 is preferably positioned between the detector 24 and the sample.

Figure 2:
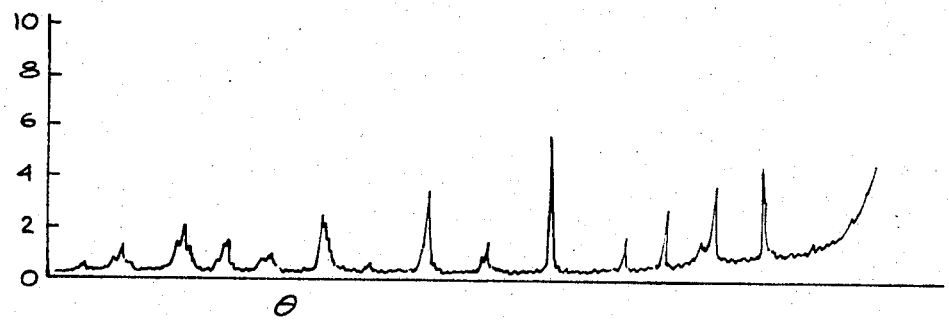
FIGURE 2 illustrates a typical diffractometer scan pattern of detected energy vs. angle $\theta$ obtained utilizing the embodiment of FIGURE 1.

The portions of the apparatus of FIGURE 1 which have been thus far described all form part of the diffractometer portion of the instrument 10. In use, the detector 24 is moved along the focal circle 16 from a position proximate to the sample holder 12 to a position approaching the target 20. The output of the detector 24 is monitored as it traverses the focal circle 16. A typical output from the detector 24 is represented by the scan pattern as shown in FIGURE 2. It will be noted that the scan pattern of FIGURE 2 is comprised of a plurality of spaced peaks. Each of these peaks of course represents constructive interference between energy reflected from a different crystal plane in the sample and occurs at a different position of the detector 24 on the circle 16. By determining the angle $\theta$ associated with each of these peaks, and by knowing the wavelength $\lambda$ of the X-ray radiation, the lattice spacing $d$ can be determined by Bragg's law: $n\lambda = 2d \sin \theta$ for different integer values of $n$.

It is recognized herein that the instrument 10 can simultaneously function as a sepctrometer in addition to a diffractometer by detecting the characteristic energy emitted by the sample in response to the X-ray energy incident thereon. For this purpose a proportional counter 30, of the type conventionally used in nondispersive spectrometers, can be provided to respond to florescent radiation emitted by the sample as a consequent of the X-ray radiation provided by target 20. In order to avoid interference with the detector 24 of the diffractometer portion of the instrument 10, the counter 30 is preferably placed outside of the plane of the focal circle 16.

Figure 3:
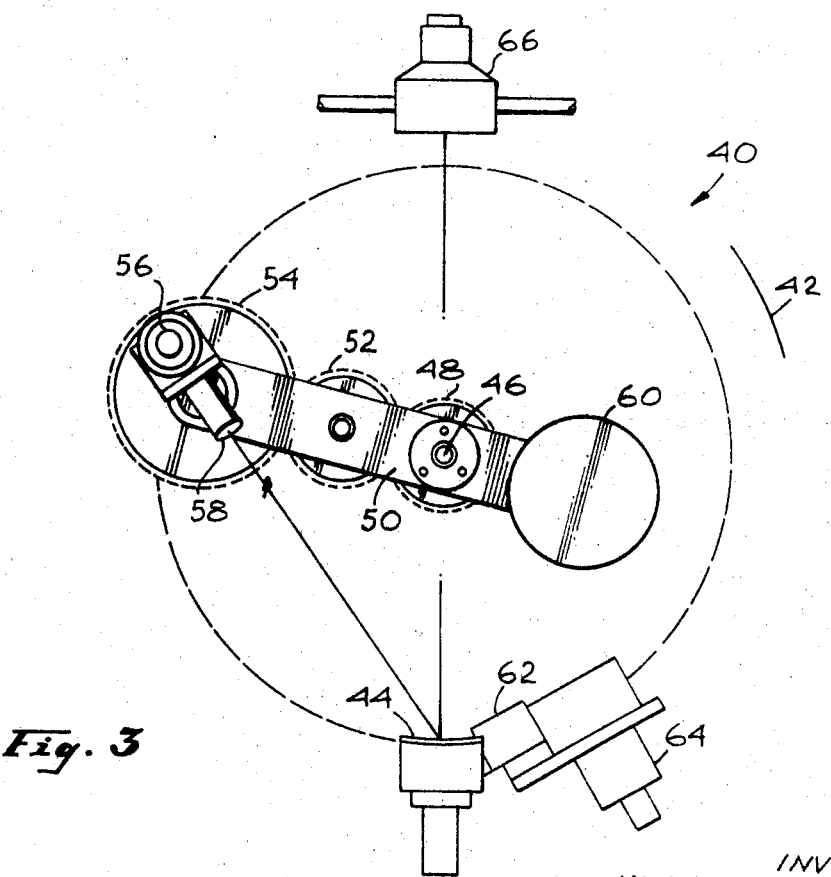
FIGURE 3 is a front view of a structural embodiment of the present invention.

Attention is now called to FIGURE 3 which illustrates a front view of an apparatus constructed in accordance with the teachings of the present invention. FIGURE 3 illustrates the instrument 40 as being mounted upon a vertically oriented aluminum plate 42 which, in addition to providing structural support, also provides shielding protection. The sample holder 44 is fixed to the plate proximate to the bottom thereof and defines a curved front surface opening upwardly. The curved front surface of the sample holder 44 is coincident with the circumference of a focal circle formed about a center shaft 46. The shaft 46 is mounted for rotation relative to the plate 40 and carries a gear 48 thereon. Fixedly secured to the shaft 46 and gear 48 is an arm 50. An idle gear 52 mounted for rotation on the arm 50 is engaged with the gear 48. A gear 54 is terminally mounted for rotation on the arm 50 and is also engaged with gear 52. The detector 56 is mounted on the gear 54. Collimator 58 is positioned in front of the detector 56. A weight 60 is mounted on a second end of the arm 50 to provide dynamic balance therefor.

Also positioned on the focal circle defined about the shaft 46 is the target or X-ray source 62. The X-ray energy focused on the source 62 is provided by X-ray tube 64. The spectrometer counter 66 is mounted on the aluminum plate outside of the focal circle.

The configuration of FIGURE 3 allows the sample holder 44 to remain in a fixed horizontal position. Thus, a variety of problems involving loose powders and liquids can be investigated without the usual container problem. Furthermore, the sample holder 44 can easily be incorporated into a variety of adiabatic enclosures without the need of a special moving vacuum seal and complicated heating or cooling lines. Any special purpose environmental rig can be designed with the sample holder as an integral part, as long as the spatial location of the sample with respect to the center of the focal circle is maintained. This feature of a fixed sample instrument in accordance with the invention allows diffraction studies to be made in situ over the whole range of high and low temperatures involving such phenomena, for example, as phase change, order and disorder transformation, strain, and radiation damage.

In the operation of the apparatus of FIGURE 3, the arm 50 is rotated by the shaft 46 by a motor (not shown) thus carrying the detector 56 along the focal circle. The sample holder 44 and X-ray target 62 are both fixedly mounted on the focal circle. As the shaft 46 rotates, the gears 48, 52, and 54 will reposition the collimator 58 and detector 56 so that it is always focused on the center of the sample. More particularly, consider the shaft 46 in FIGURE 3 to be rotating clockwise. As a consequence, the gear 48 will rotate clockwise thereby rotating the idler gear 52 counterclockwise and the gear 54 clockwise. If the gear ratios are properly selected, the gearing will continually reposition the collimator 58 and detector 56 carried by the gear 54 so that they are directed at the center of the curved sample for each position of the detector along the focal circle.

In order to better teach the construction of the instrument 40 of FIGURE 3, constructional details and some experimental results will now be discussed. The X-ray tube 64 can, for example, consist of a line source filament constructed of a ¾" tungsten wire having a dimension of 0.010 inch. An elliptical focus grid of copper (not shown) can be placed adjacent the filament in order to focus the energy provided by the filament on the target. The selection of target material determines the wavelength $\lambda$ of the X-ray radiation provided to the sample and can for example comprise aluminum, titanium, chromium, etc. The filament-to-target distance can be of the order of 1⅛". The focal circle can have a radius of approximately five inches.

The width of the sample holder and the receiving slit length should conform to the width of the tungsten filament; i.e., ¾" for the exemplary tungsten wire previously mentioned.

The counter 66 in FIGURE 3 can comprise a gas-filled proportional counter but other pulse amplitude energy dependent detectors can be used to detect the low X-ray energy. The variation of florescence sensed by the counter 66 identifies the elements present in the sample.

Figure 4:
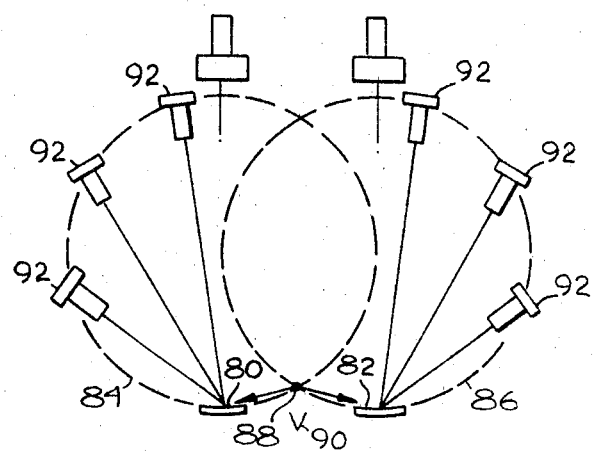
FIGURE 4 schematically illustrates an embodiment of the invention in which two samples can be simultaneously analyzed.

Attention is now called to FIGURE 4 which illustrates an alternative embodiment of the present invention in which first and second samples are curved to respectively define focal circles 84 and 86. An X-ray energy target 88 is positioned so that the focal point thereon lies at a point of intersection of the circles 84 and 86. Thus, energy focused on the target 88 by the filament 90 will be provided to both samples 80 and 82. Accordingly, it should be appreciated that by utilizing the technique suggested by the embodiment of FIGURE 4, two samples can be analyzed simultaneously while using a single source of X-ray energy.

The embodiment of FIGURE 4 also suggests however that the diffractometer scans for each of the samples 80 and 82 can be completed much more rapidly by providing a plurality of detectors 92 on each of the focal circles 84 and 86. By providing a plurality of detectors 92 on each of the focal circles, each detector need only traverse a portion of the focal circle and as a consequence full diffraction patterns can be developed much more rapidly. It should be appreciated of course that multiple detectors can also be employed in an embodiment of the invention as shown in FIGURE 1 for analyzing a single sample more rapidly than was previously discussed. The embodiment of FIGURE 4 of course also contemplates providing proportional counters for detecting the florescent energy emitted by each of samples 80 and 82 responsive to the incident X-ray radiation provided by target 88.

From the foregoing, it should be appreciated that applicants have herein provided an improved instrument for elementally and structurally analyzing unknown samples. By placing the X-ray source, that is the target, directly on the focal circle, optimum use is made of the energy provided thereby. Accordingly, the instrument as a whole requires relatively little energy, making it extremely suitable for space situations, such as lunar material analysis. Other characteristics of the disclosed embodiments are also compatible with a lunar mission; more particularly, the instrument can be very simply and therefore reliably constructed and is essentially comprised of only a single moving part.

Although specific embodiments of the invention have been disclosed herein, it is understood that modifications and variations will occur to those skilled in the art falling within the spirit and scope of the invention as defined by the appended claims. For example only, although a nondispersive type spectrometer has been discussed herein, it will be appreciated that a dispersive type spectrometer can be employed instead in combination with the diffractometer where greater sensitivity is required.

What is claimed is:
1. An instrument useful for simultaneously performing both elemental and structural analysis of a crystalline sample, said instrument comprising:
   means for fixedly supporting said crystalline sample;
   source means fixedly mounted relative to said sample, for illuminating said sample with X-ray energy to cause said sample to (1) reflect said X-ray energy in a pattern characteristic of the sample lattice structure and (2) emit secondary X-ray energy having wavelengths characteristic of the constituent elements of said sample;
   a first X-ray energy detector having a receiving slit;
   means supporting said first X-ray energy detector for movement of said receiving slit along a focal circle intersecting said sample and said source means;
   means for continually orienting said first energy detector receiving slit toward said sample as it moves along said focal circle for detecting said reflected X-ray energy;
   a second X-ray energy detector; and
   means fixedly supporting said second X-ray energy detector outside the plane of said focal circle for detecting said secondary X-ray energy.
2. The instrument of claim 1 wherein said source means comprises a target defining a focal point positioned on said circle; and
   electron source means for providing electron energy to said focal point.
3. The instrument of claim 1 wherein said sample is shaped to extend along a portion of said focal circle.
4. The instrument of claim 1 wherein said sample is retained in a sample holder having a front curved surface opening upwardly.
5. The instrument of claim 1 including a plurality of additional X-ray energy detector means mounted for movement along said focal circle; and
   means for moving said additional detector means along said focal circle.
6. An instrument useful for simultaneously performing both elemental and structural analysis of a crystalline sample, said instrument comprising in combination:
   first and second crystalline samples each being fixedly mounted;
   a fixed source of X-ray energy mounted proximate to said first and second samples at the intersection of first and second focal circles on which said samples are respectively positioned for simultaneously illuminating said samples to cause each sample to (1) reflect said X-ray energy in a pattern characteristic of its lattice structure and (2) emit secondary X-ray energy having wavelengths characteristic of the constituent elements of said sample;
   first and second X-ray energy detectors respectively mounted for movement along said first and second focal circles for detecting said reflected X-ray energy; and at least first and second fixedly mounted X-ray energy detectors respectively positioned outside of said first and second focal circles.
7. The combination of claim 6 including an additional plurality of spaced detectors each mounted for movement along one of said focal circles.

References Cited

UNITED STATES PATENTS

| | | | |
|---|---|---|---|
| 2,540,821 | 2/1951 | Harker | 250—51.5 |
| 2,648,011 | 3/1953 | Good | 250—51.5 |
| 2,977,478 | 3/1961 | Wuppermann. | |
| 3,102,196 | 8/1963 | Ladell et al. | 250—51.5 |
| 3,148,275 | 9/1964 | Mack | 250—51.5 |

RALPH G. NILSON, *Primary Examiner.*

S. C. SHEAR, *Assistant Examiner.*